United States Patent
Chen et al.

(10) Patent No.: US 10,491,923 B2
(45) Date of Patent: Nov. 26, 2019

(54) DIRECTIONAL DEBLOCKING FILTER

(71) Applicant: GOOGLE LLC, Mountain View, CA (US)

(72) Inventors: Cheng Chen, Mountain View, CA (US); Jingning Han, Santa Clara, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 16 days.

(21) Appl. No.: 15/844,894

(22) Filed: Dec. 18, 2017

(65) Prior Publication Data

US 2019/0052912 A1 Feb. 14, 2019

Related U.S. Application Data

(60) Provisional application No. 62/544,976, filed on Aug. 14, 2017.

(51) Int. Cl.
*G06K 9/40* (2006.01)
*H04N 19/105* (2014.01)
(Continued)

(52) U.S. Cl.
CPC .......... *H04N 19/86* (2014.11); *H04N 19/117* (2014.11); *H04N 19/134* (2014.11);
(Continued)

(58) Field of Classification Search
CPC .... H04N 19/117; H04N 19/14; H04N 19/176; H04N 19/80; H04N 19/86
See application file for complete search history.

(56) References Cited

U.S. PATENT DOCUMENTS 5,367,385 A 11/1994 Yuan
7,072,525 B1 7/2006 Covell
(Continued)

FOREIGN PATENT DOCUMENTS

EP 2339852 A1 6/2011
EP 2477403 A1 7/2012
WO 2011128023 A1 10/2011

OTHER PUBLICATIONS

Bankoski, et al., "Technical Overview of VP8, An Open Source Video Codec for the Web", Jul. 11, 2011, 6 pp.
(Continued)

*Primary Examiner* — Alison Slater
(74) *Attorney, Agent, or Firm* — Young Basile Hanlon & MacFarlane, P.C.

(57) ABSTRACT

Multiple directional filters are applied against lines of pixels associated with a video block to determine filtered noise values. Each directional filter uses a different direction for filtering lines of pixels. For example, for each pixel value of the video block along a line of pixels having a direction corresponding to a directional filter, a difference can be determined between the pixel value and a corresponding pixel value along the line of pixels and outside of the video block. A value for line of pixels is determined as the sum of the absolute values of each of the differences, and a filtered noise value is determined as the sum of the values for the lines of pixels. The directional filter used to determine a lowest one of the filtered noise values for the video block is then selected. The video block is filtered using the selected directional filter.

17 Claims, 8 Drawing Sheets

(51) Int. Cl.

| | |
|---|---|
| *H04N 19/14* | (2014.01) |
| *H04N 19/86* | (2014.01) |
| *H04N 19/176* | (2014.01) |
| *H04N 19/139* | (2014.01) |
| *H04N 19/117* | (2014.01) |
| *H04N 19/42* | (2014.01) |
| *H04N 19/134* | (2014.01) |
| *H04N 19/169* | (2014.01) |
| *H04N 19/593* | (2014.01) |
| *H04N 19/82* | (2014.01) |

(52) U.S. Cl.
CPC .......... *H04N 19/139* (2014.11); *H04N 19/14* (2014.11); *H04N 19/169* (2014.11); *H04N 19/176* (2014.11); *H04N 19/439* (2014.11); *H04N 19/593* (2014.11); *H04N 19/82* (2014.11)

(56) References Cited

U.S. PATENT DOCUMENTS

| | | | |
|---|---|---|---|
| 7,961,357 | B2 | 6/2011 | Kim et al. |
| 8,787,443 | B2 | 7/2014 | Sun et al. |
| 2011/0069752 | A1 | 3/2011 | Watanabe et al. |
| 2011/0123121 | A1* | 5/2011 | Springer .............. H04N 19/176 382/199 |
| 2011/0200100 | A1 | 8/2011 | Kim et al. |
| 2013/0129240 | A1 | 5/2013 | Shima |
| 2015/0023425 | A1 | 1/2015 | Sun et al. |
| 2015/0163491 | A1 | 6/2015 | Alshin et al. |
| 2016/0171710 | A1* | 6/2016 | Emery ................. G06K 9/4609 382/199 |
| 2016/0212363 | A1* | 7/2016 | Kim ....................... H04N 5/142 |

OTHER PUBLICATIONS

Series H: Audiovisual and Multimedia Systems, Coding of moving video: Implementors Guide for H.264: Advanced video coding for generic audiovisual services, International Telecommunication Union, Jul. 30, 2010, 15 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

Jeong et al; "A Directional Deblocking Filter Based on Intra Prediction for H.264/AVC"; IEICE Electronics Express, vol. 6, No. 12, pp. 864-869; Jun. 25, 2009.

Valin JM. The Daala directional deringing filter. arXiv preprint arXiv:1602.05975. Feb. 18, 2016.

Bankoski et al., "VP8 Data Format and Decoding Guide", Independent Submission RFC 6389, Nov. 2011, 305 pp. pp. 123-124.

Bankoski et al., "VP8 Data Format and Decoding Guide draft-bankoski-vp8-bitstream-02", Network Working Group, Internet-Draft, May 18, 2011, 288 pp. pp. 134.

"Introduction to Video Coding Part 1: Transform Coding", Mozilla, Mar. 2012, 171 pp. pp. 18-19, 29-32, 42, 49, 52, 147-180, 157.

"Overview VP7 Data Format and Decoder", Version 1.5, On2 Technologies, Inc., Mar. 28, 2005, 65 pp. pp. 9, 22-23, 26, 33, 36, 38-39, 49-52, 60, 62-65.

Series H: Audiovisual and Multimedia Systems, Infrastructure of audiovisual services—Coding of moving video, Advanced video coding for generic audiovisual services, International Telecommunication Union, Version 11, Mar. 2009. 670 pp. pp. 202-214.

Series H: Audiovisual and Multimedia Systems, Infrastructure of audiovisual services—Coding of moving video, Advanced video coding for generic audiovisual services, International Telecommunication Union, Version 12, Mar. 2010, 676 pp. pp. 197-208.

Series H: Audiovisual and Multimedia Systems, Infrastructure of audiovisual services—Coding of moving video, Amendment 2: New profiles for professional applications, International Telecommunication Union, Apr. 2007, 75 pp. pp. 38-39.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp. pp. 193-204.

Series H: Audiovisual and Multimedia Systems, Infrastructure of audiovisual services—Coding of moving video, Advanced video coding for generic audiovisual services, Version 1, International Telecommunication Union, May 2003, 282 pp. pp. 144-153.

Series H: Audiovisual and Multimedia Systems, Infrastructure of audiovisual services—Coding of moving video, Advanced video coding for generic audiovisual services, Version 3, International Telecommunication Union, Mar. 2005, 343 pp. pp. 182-194.

"VP6 Bitstream and Decoder Specification", Version 1.02, On2 Technologies, Inc., Aug. 17, 2006, 88 pp. pp. 46.

"VP6 Bitstream and Decoder Specification", Version 1.03, On2 Technologies, Inc., Oct. 29, 2007, 95 pp. pp. 51.

"VP8 Data Format and Decoding Guide, WebM Project", Google On2, Dec. 1, 2010, 103 pp. pp. 94.

Jeong et al., "A directional deblocking filter based on intra prediction for H.264/AVC", IEICE Electronics Express, vol. 6, No. 12, Jun. 25, 2009, pp. 864-869.

Maani, "CE8 Subset 2: Parametric Adaptive Loop Filter", JCT-VC of ITU-T SG16 WP3 and ISO/IEC JTC1/SC29/WG11, 6th Meeting, Torino, Italy, Jul. 14-22, 2011, 6 pgs.

Lin et al, "Improved Advanced Motion Vector Prediction", JCT-VC of ITU-T SG16 WP3 and ISO/IEC JTC1/SC29/WG11, 4th Meeting: Daegu, Korea, Jan. 20-28, 2011, 8 pgs.

Kim et al., "An Efficient Motion Vector Coding Scheme Based on Minimum Bitrate Prediction", IEEE Transactions on Image Processing, vol. 8, No. 8, Aug. 1, 1999, pp. 1117-1120.

\* cited by examiner

DIRECTIONAL DEBLOCKING FILTER

CROSS REFERENCE TO RELATED APPLICATION(S)

This disclosure claims the benefit of U.S. Provisional Application No. 62/544,976, filed Aug. 14, 2017, the disclosure of which is hereby incorporated by reference in its entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for filtering a video block according to an implementation of this disclosure comprises applying directional filters against lines of pixels associated the video block to determine filtered noise values for the video block. Each of the directional filters uses a different direction for filtering one or more of the lines of pixels. The method further comprises selecting a directional filter used to determine a lowest one of the filtered noise values for the video block. The method further comprises filtering the video block using the selected directional filter.

An apparatus for filtering a video block according to an implementation of this disclosure comprises a processor configured to execute instructions stored in a non-transitory memory. The instructions include instructions to apply directional filters against lines of pixels associated the video block to determine filtered noise values for the video block. Each of the directional filters uses a different direction for filtering one or more of the lines of pixels. The instructions further include instructions to select a directional filter used to determine a lowest one of the filtered noise values for the video block. The instructions further include instructions to filter the video block using the selected directional filter.

A non-transitory computer-readable storage medium according to an implementation of this disclosure comprises processor-executable routines that, when executed by a processor, facilitate a performance of operations for filtering a video block. The operations comprise applying directional filters against lines of pixels associated the video block to determine filtered noise values for the video block. Each of the directional filters uses a different direction to filter one or more of the lines of pixels. The operations further comprise selecting a directional filter used to determine a lowest one of the filtered noise values for the video block. The operations further comprise filtering the video block using the selected directional filter.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
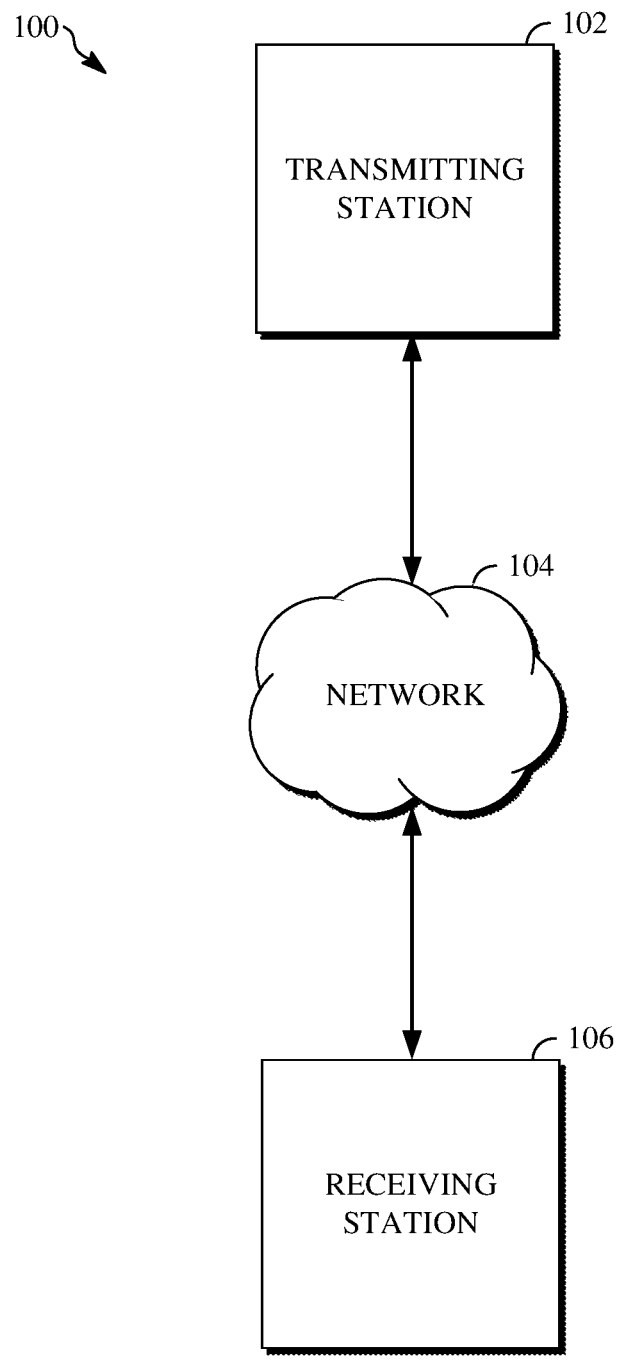
FIG. 1 is a schematic of a video encoding and decoding system.

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. Aspects of an encoding or decoding process (e.g., prediction, transform, and/or quantization operations) can give rise to discontinuities along block boundaries, such as blocking artifacts. Blocking artifacts can be visually distracting, reduce the quality of an output video stream, prevent a frame from being effectively used as a reference frame for coding subsequent frames, or cause other issues.

Blocking artifacts may be reduced by applying a filter, such as a deblocking filter, to pixels of a video block. The filter may be applied to a reconstructed frame or a portion of a reconstructed frame at the end of a reconstructing phase in the encoding process or at the end of the decoding process. Once a reconstructed frame is processed using the filter, it can be used as a reference frame for predicting subsequent frames. However, not all filters are effective at reducing blocking artifacts. For example, many filters may only process pixels along a vertical or horizontal edge of a video block, even where motion of an object is not vertical or horizontal. However, those filters may not be effective at reducing blocking artifacts for image textures that are non-perpendicular to the edges of a video block. In another example, some filters may process pixels in directions other than along the horizontal and vertical edges on a pixel-by-pixel basis. However, those filters may not be effective at selecting an optimal filtering direction because they do not consider multiple pixels at a time.

Implementations of this disclosure include selecting a directional filter for filtering pixels of a video block. Multiple directional filters are applied against lines of pixels associated with a video block to determine filtered noise values. Each directional filter uses a different direction for filtering lines of pixels. For example, for each pixel value of the video block along a line of pixels having a direction corresponding to a directional filter, a difference can be determined between the pixel value and a corresponding pixel value along the line of pixels and outside of the video block. A value for line of pixels is determined as the sum of the absolute values of each of the differences, and a filtered noise value is determined as the sum of the values for the lines of pixels. The directional filter used to determine a lowest one of the filtered noise values for the video block is then selected. The video block is filtered using the selected directional filter.

A filtered noise value may reflect the similarity or homogeneity of the data within the video block along a direction of the directional filter used to determine that filtered noise value. For example, when a filtered noise value is larger, it may reflect that the image within the video block is relatively inhomogeneous. However, when a filtered noise value is smaller, the image within the video block may be relatively flat and thus represent an object without abrupt changes in the pixel values of the video block. The shape of an object can be determined, along with smoothing signals along the object, by determining a filtered noise value for the video block based on lines of pixels, rather than on a pixel-by-pixel basis.

Further details of techniques for using a directional deblocking filter are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
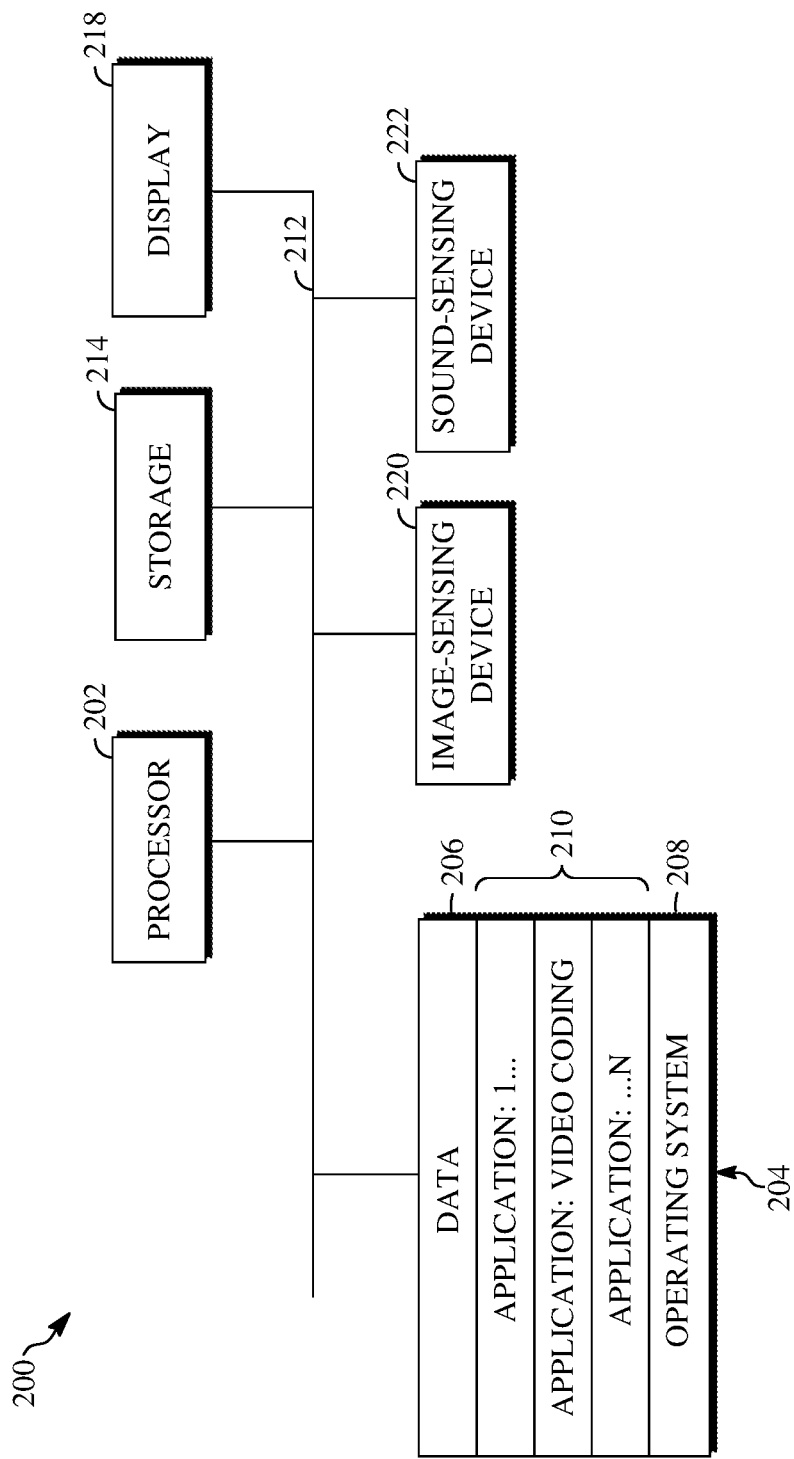
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
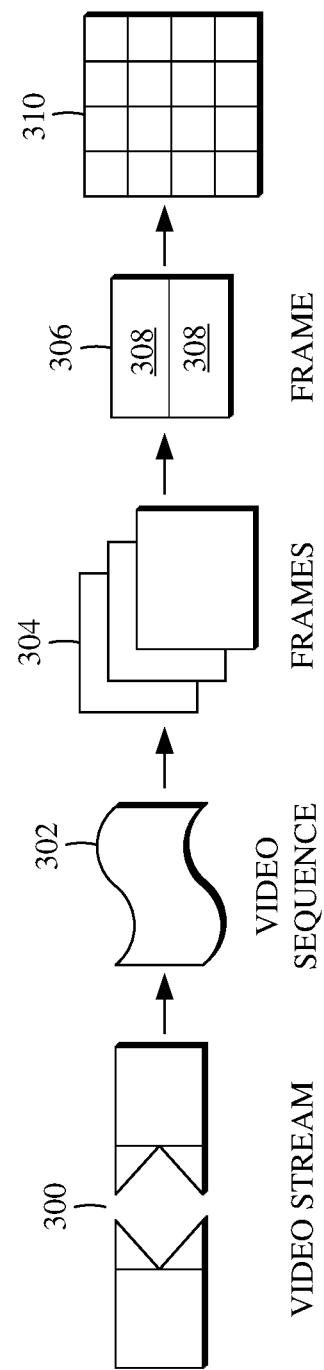
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
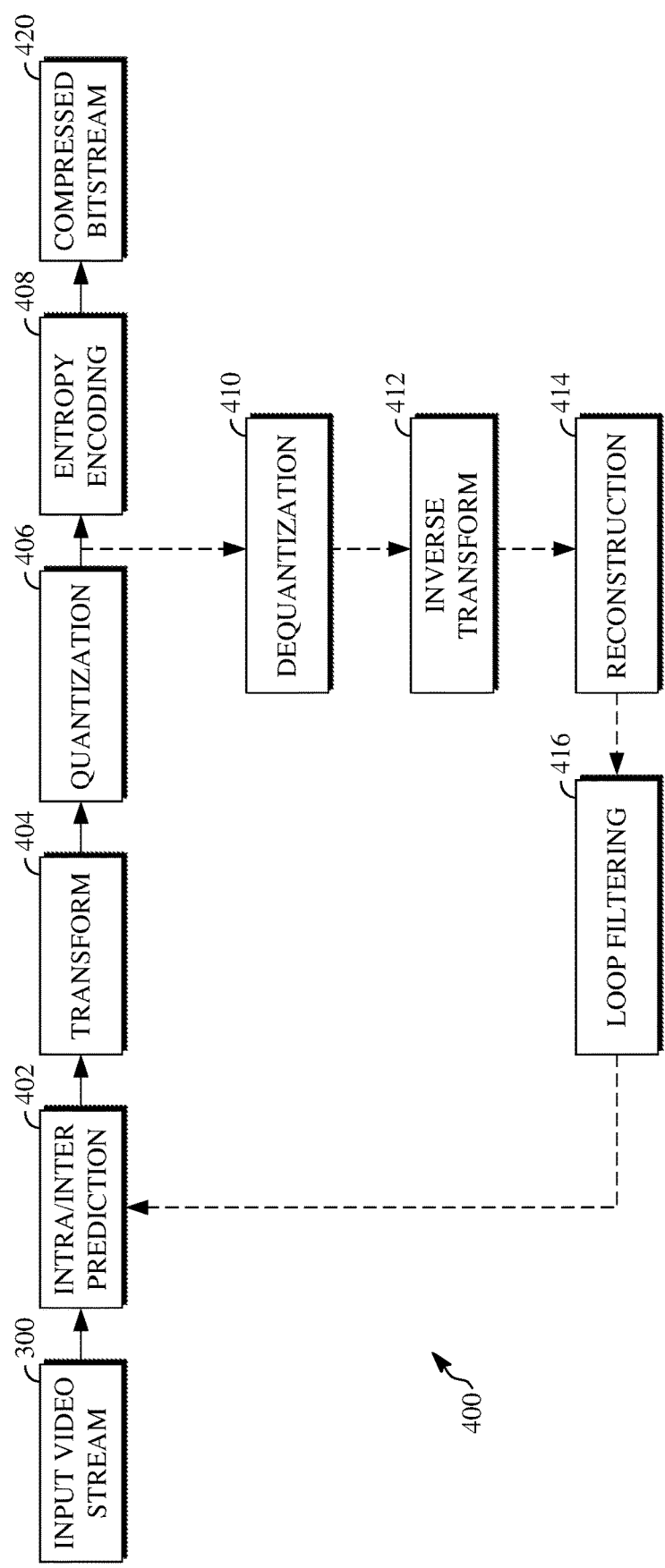
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
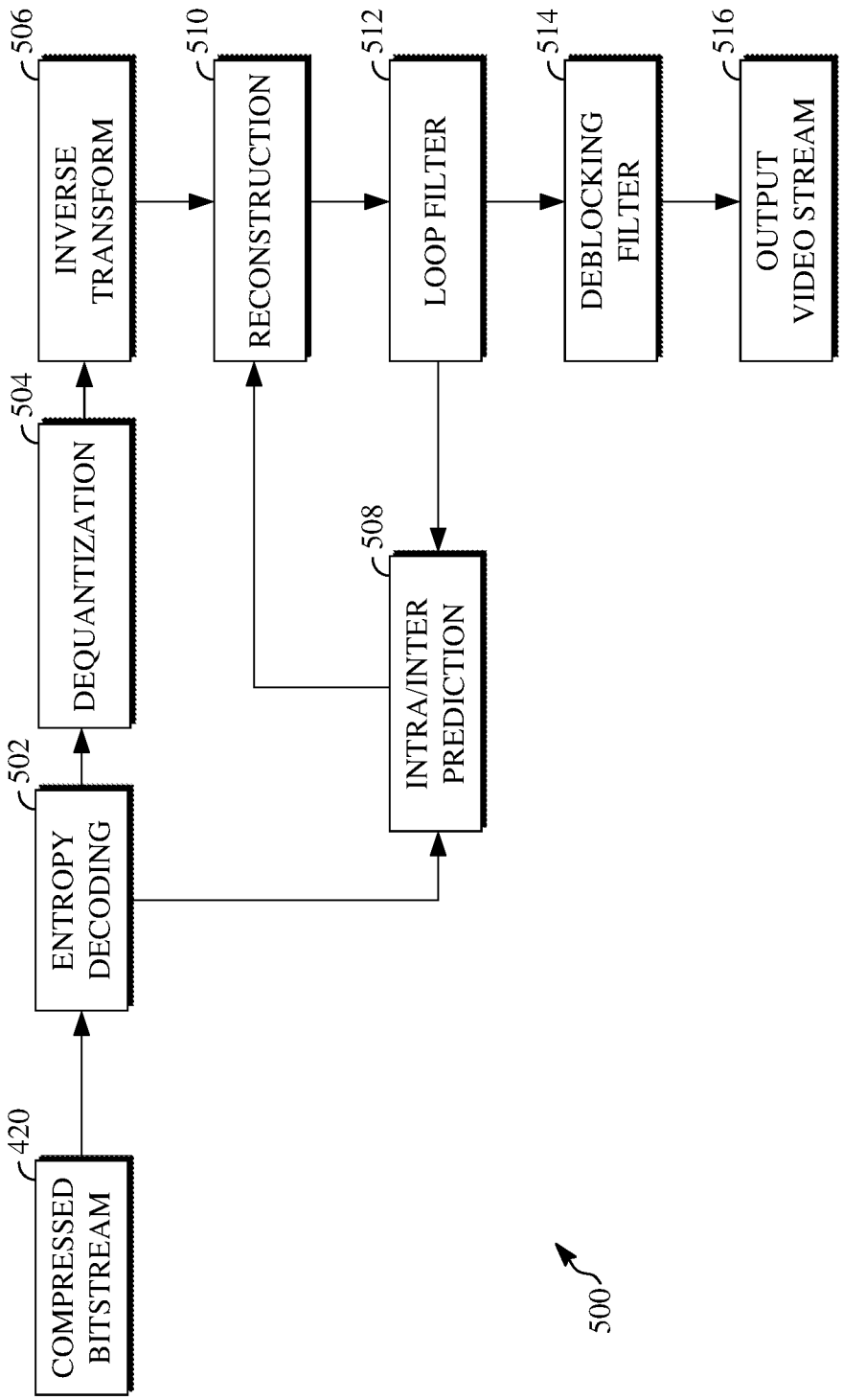
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
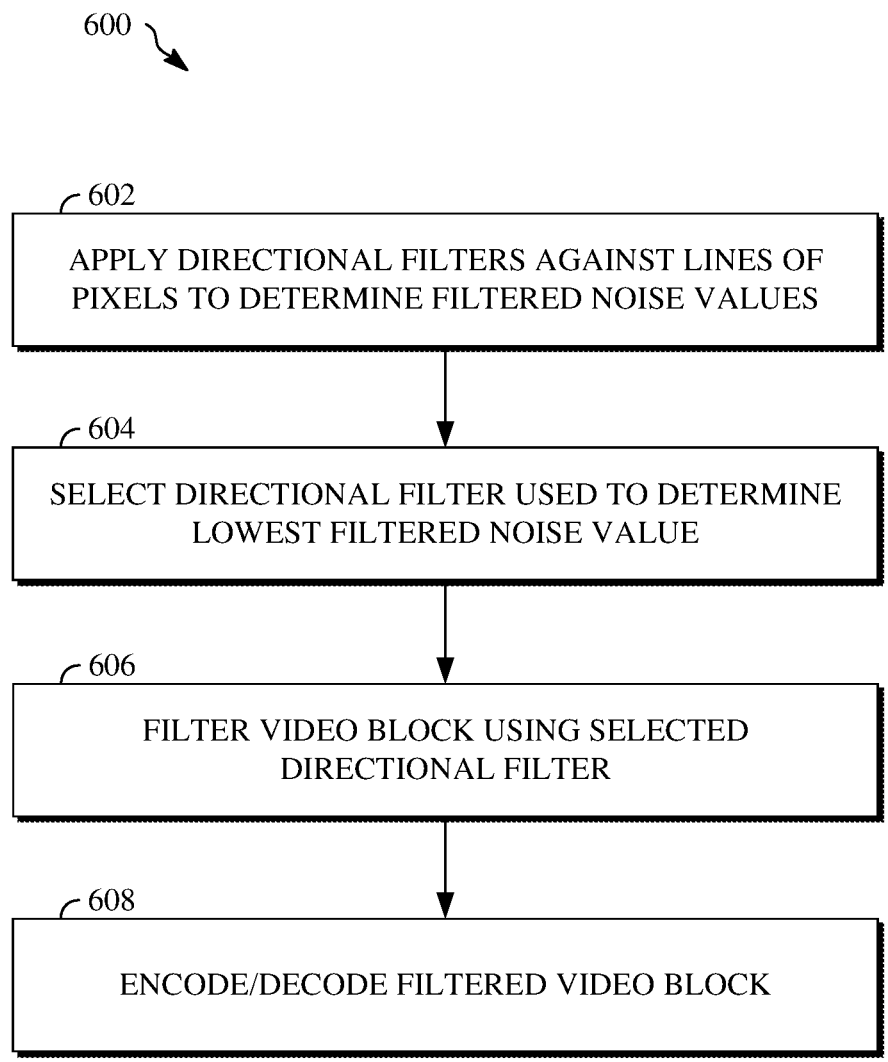
FIG. 6 is a flowchart diagram of an example of a technique for encoding or decoding a video block filtered using a directional filter.
Figure 7:
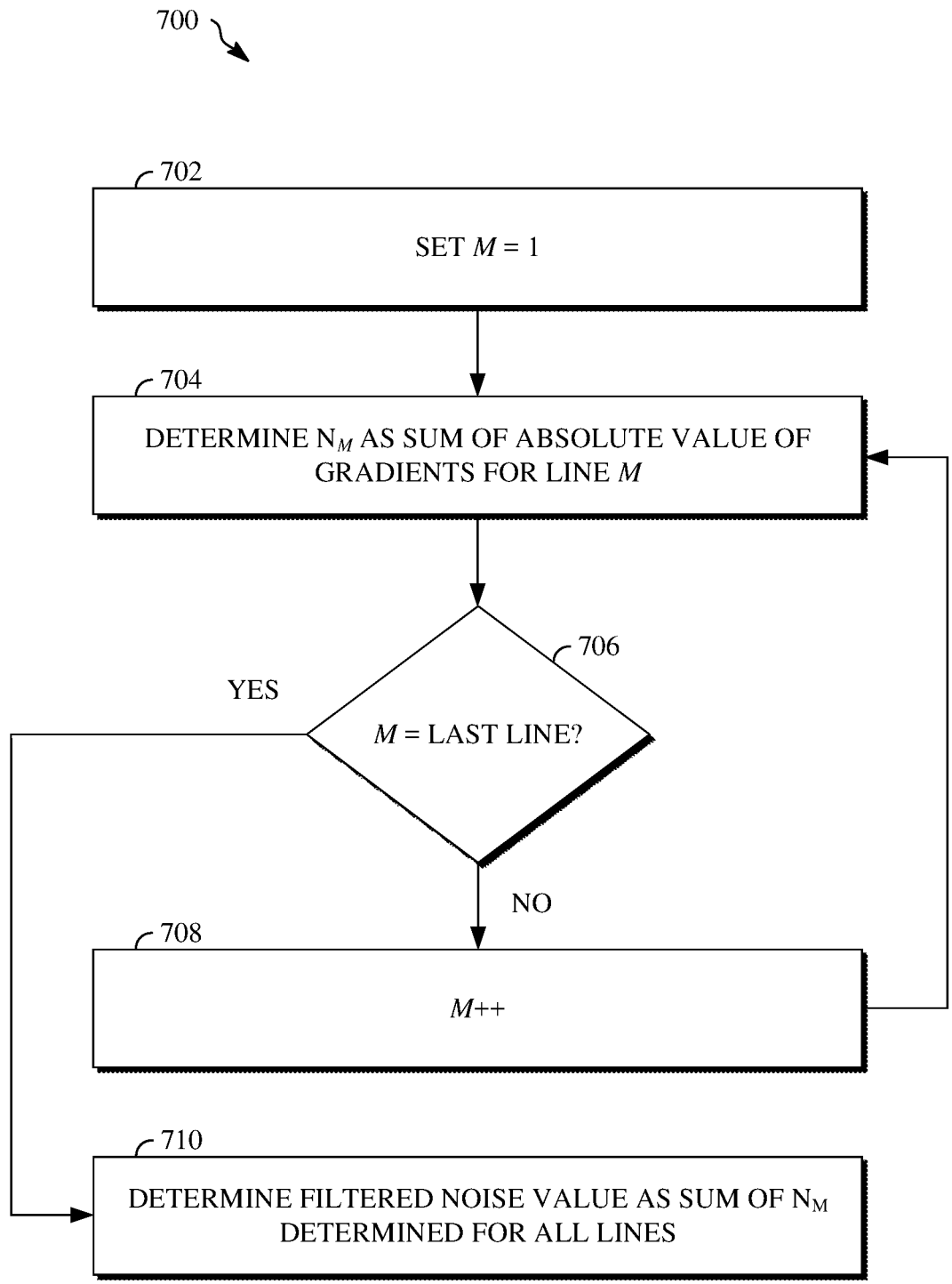
FIG. 7 is a flowchart diagram of an example of a technique for determining a filtered noise value.

Techniques for filtering video blocks are now described with respect to FIGS. 6 and 7. FIG. 6 is a flowchart diagram of an example of a technique 600 for encoding or decoding a video block filtered using a directional filter. FIG. 7 is a flowchart diagram of an example of a technique 700 for determining a filtered noise value. One or both of the technique 600 or the technique 700 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 600 and/or the technique 700. One or both of the technique 600 or the technique 700 can be implemented using specialized hardware or firmware. As explained above, some computing devices may have multiple memories or processors, and the operations described in one or both of the technique 600 or the technique 700 can be distributed using multiple processors, memories, or both.

For simplicity of explanation, the technique 600 and the technique 700 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, a flowchart diagram of a technique 600 for encoding or decoding a video block filtered using a directional filter is shown. At 602, directional filters are applied against lines of pixels associated with a video block to be encoded or decoded to determine filtered noise values for the video block. The video block is included in a reconstructed video frame. Partition information for the reconstructed video frame indicates the edges of the video block (e.g., the outer perimeter of pixels adjacent to pixels of other video blocks in the reconstructed video frame).

The directional filters applied against the lines of pixels use different directions for filtering the lines of pixels. For example, a direction of one of the directional filters can be one of 0 degrees, 45 degrees, 90 degrees, or 135 degrees. As such, there may be four directional filters applied against the lines of pixels, such as where a first one has a 0 degree direction, a second one has a 45 degree direction, a third one has a 90 degree direction, and a fourth one has a 135 degree direction.

The direction of a directional filter may be with respect to an edge of the video block. For example, the 0 degree direction may represent a vertical line along an edge of the video block and the 90 degree direction may represent a horizontal line along another edge of the video block (e.g., the left and top boundaries of the video block, respectively). The 45 degree direction may thus represent a 45 degree angle clockwise with respect to the vertical line, and the 135 degree direction may thus represent a 135 degree angle clockwise with respect to the vertical line.

A line of pixels is oriented in a direction corresponding to one of the directional filters. The number of lines of pixels associated with the video block is based on the size of the video block. For example, there are eight lines of pixels associated with an 8×8 video block. In another example, there are sixteen lines of pixels associated with a 16×16 video block. Alternatively, the number of lines of pixels associated with the video block may be limited. For example, directional filters may be applied against some, but not all, of the lines of pixels of the video block. For example, a maximum threshold for lines of pixels may be used for blocks of larger sizes, such as to limit the performance costs of the technique 600.

The length of a line of pixels against which a directional filter is applied, or line length, can be based on a size of the video block. For example, the line length can be one-half of the Y-axis length of the video block. However, other line lengths may be used. For example, when the direction of a directional filter is 45 degrees or 135 degrees, the line length may instead be one-quarter of the Y-axis length of the video block. In such a case, the first pixel in the one-quarter length line can be the pixel located on or adjacent to an edge of the video block. The value of the last pixel in the one-quarter length line can be extended across a next one-quarter length starting at the pixel position after the last pixel along the line.

Determining a filtered noise value by applying a directional filter to a line of pixels includes determining, for each pixel value of the video block along one of the lines of pixels, a difference between the pixel value and a corresponding pixel value along the line of pixels and outside of the video block, which difference may be referred to as a gradient. For example, a pixel A is located inside the video block at a first position along the line of pixels and a pixel A' is located outside the video block at that first position. The difference between the value of pixel A and the value of pixel A' is a gradient. Similarly, the difference between the value of a pixel N within the video block along the line of pixels and the value of a corresponding pixel N' outside the video block along the line of pixels is another gradient.

The absolute value of each gradient for a line of pixels is summed to a value for that line of pixels using the directional filter applied to that line of pixels. Values are then determined for the remaining lines of pixels associated with the video block using the same directional filter. Thereafter, the values determined by summing the absolute values of gradients for each line of pixels is summed to determine the filtered noise value for that directional filter. Implementations for determining filtered noise values are described below with respect to FIG. 7.

The total number of filtered noise values determined by applying directional filters against lines of pixels associated with the video block can be based on the number of directional filters that are applied against those lines of pixels. For example, one filtered noise value may be determined by applying a given direction filter against lines of pixels associated with the video block. Where four directional filters are applied against lines of pixels associated with the video block, four filtered noise values may be determined.

At 604, one of the directional filters applied against the lines of pixels is selected. The selected directional filter is determined to be the directional filter used to determine a lowest one of the filtered noise values for the video block. For example, selecting the directional filter can include comparing the filtered noise values determined by applying different ones of the multiple directional filters against the lines of pixels associated with the video block. As a result of the comparisons, a lowest one of the filtered noise values can be identified.

At 606, the video block using the selected directional filter. Filtering the video block using the selected directional filter can include applying the selected directional filter against each pixel value of each edge of the video block. For example, the selected directional filter can be applied to all pixels of the video block on a line-by-line basis. At 608, the filtered video block is encoded or decoded. For example, during an encoding process, the filtered video block is encoded to an encoded bitstream (e.g., the compressed bitstream 420 shown in FIG. 4). In another example, during a decoding process, the filtered video block is decoded to an output video stream (e.g., the output video stream 516 shown in FIG. 5).

In some implementations, filtering the video block using the selected directional filter can include extracting one or more pixels from the video block. For example, extracting one or more pixels from the video block can include storing one or more pixel values of the video block to a buffer. The stored one or more pixel values can then be filtered within the buffer using the selected directional filter. The filtered one or more pixel values can be output directly to an encoded bitstream to which the video block will be encoded, such as during an encoding process, or to an output video stream to which the video block will be decoded, such as during a decoding process. Alternatively, the filtered one or more pixel values can be replaced within the video block before the video block is encoded to the encoded bitstream or decoded to the output video stream. For example, the filtering of the pixels of the video block can be performed within in the buffer, but the actual encoding or decoding can occur independently of the buffer.

In some implementations, two or more of the filtered noise values may be determined to be the lowest filtered noise value. In such an implementation, selecting the directional filter can include selecting the one of the two or more of the directional filters that has a direction corresponding to an edge of the video block. Alternatively, in such an implementation, selecting the directional filter can include selecting the one of the two or more of the directional filters that was first applied against pixels of the video block.

In some implementations, the directions of the directional filters applied against pixels of the video block can include directions other than 0 degrees, 45 degrees, 90 degrees, and 135 degrees. For example, a direction of a directional filter applied against pixels of the video block, and thus selectable for filtering the video block, can include 30 degrees, 60 degrees, 120 degrees, 150 degrees, or another number of degrees. For example, the direction of a directional filter may, in some implementations, be between 0 and 180 degrees, inclusive.

In some implementations, the directional filters may correspond to more than one type of filter. For example, some of the directional filters may be deblocking filters, sample adaptive offset filters, filters that process temporal differences in pixel values associated with one or more video blocks, filters that process spatial differences in pixel values associated with one or more video blocks, other low-pass filters, or the like, or a combination thereof.

In some implementations, the technique 600 can include limiting a number of filtered noise values determined, such as to limit the number of directional filters selectable for filtering the video block. In some implementations, there may be no limit to the number of filtered noise values determined or, to the extent different, to the number of directional filters selectable for filtering the video block.

In some implementations, the total number of filtered noise values may not be based on or otherwise limited by the number of directional filters applied against the lines of pixels associated with the video block. For example, the filtered noise values may be determined by applying different directional filters against a single line of pixels associated with the video block. Each of the different directional filters may, for example, have a different direction or be a different type of filter. Alternatively, each of the different directional filters may have the same direction and be of a different filter type, or each of the different directional filters may have a different direction and be of the same filter type.

In another example, the filtered noise values may be determined by applying different directional filters against multiple lines of pixels. Each of the different directional filters may, for example, have a different direction or be a different type of filter. Alternatively, each of the different directional filters may have the same direction and be of a different filter type, or each of the different directional filters may have a different direction and be of the same filter type.

In some implementations, filtering the video block can include using more than one selected directional filter. For example, a first directional filter can be selected for filtering pixels along a first edge of the video block and a second directional filter can be selected for filtering pixels along a second edge of the video block. Filtering the video block may thus include filtering the pixels along the first edge of the video block using the first directional filter and filtering the pixels along the second edge of the video block using the second directional filter.

Referring next to FIG. 7, a technique 700 for determining a filtered noise value is shown. At 702, a variable, M, is set to the value 1. The variable M represents a line of pixels associated with a video block. For example, when M equals 1, aspects of the technique 700 are performed with respect to a first line of pixels associated with the video block, when M equals 2, aspects of the technique 700 are performed with respect to a second line of pixels associated with the video block, and so on.

At 704, a variable, $N_M$, is determined as the sum of the absolute values of gradients for the line of pixels, M. That is, individual gradients are determined for each position along the line of pixels, M, such as described above with respect to FIG. 6. The absolute values of each of those gradients is then summed to determine the value of $N_M$ for that line of pixels. At 706, a determination is made as to whether the line of pixels, M, is the last line of pixels associated with the video block. For example, where a size of the video block is 8×8, the determination can include determining whether M equals 8. If it is determined that M is not the last line of pixels associated with the video block, then, at 708, the value of M is increased by 1. The technique 700 then returns to 704 where a new value of N is determined for the next line of pixels.

However, if it is determined that M is the last line of pixels associated with the video block, then, at 710, the values of N determined for each of the lines, M, are summed to determine a filtered noise value for the directional filter. The technique 700 may then be repeated to determine filtered noise values for other directional filters. The filtered noise values determined by performing the technique 700 a number of times may then be compared to determine a lowest one of those filtered noise values. That lowest filtered noise value may thereafter be selected as the selected directional filter to be applied against the video block.

Figure 8:
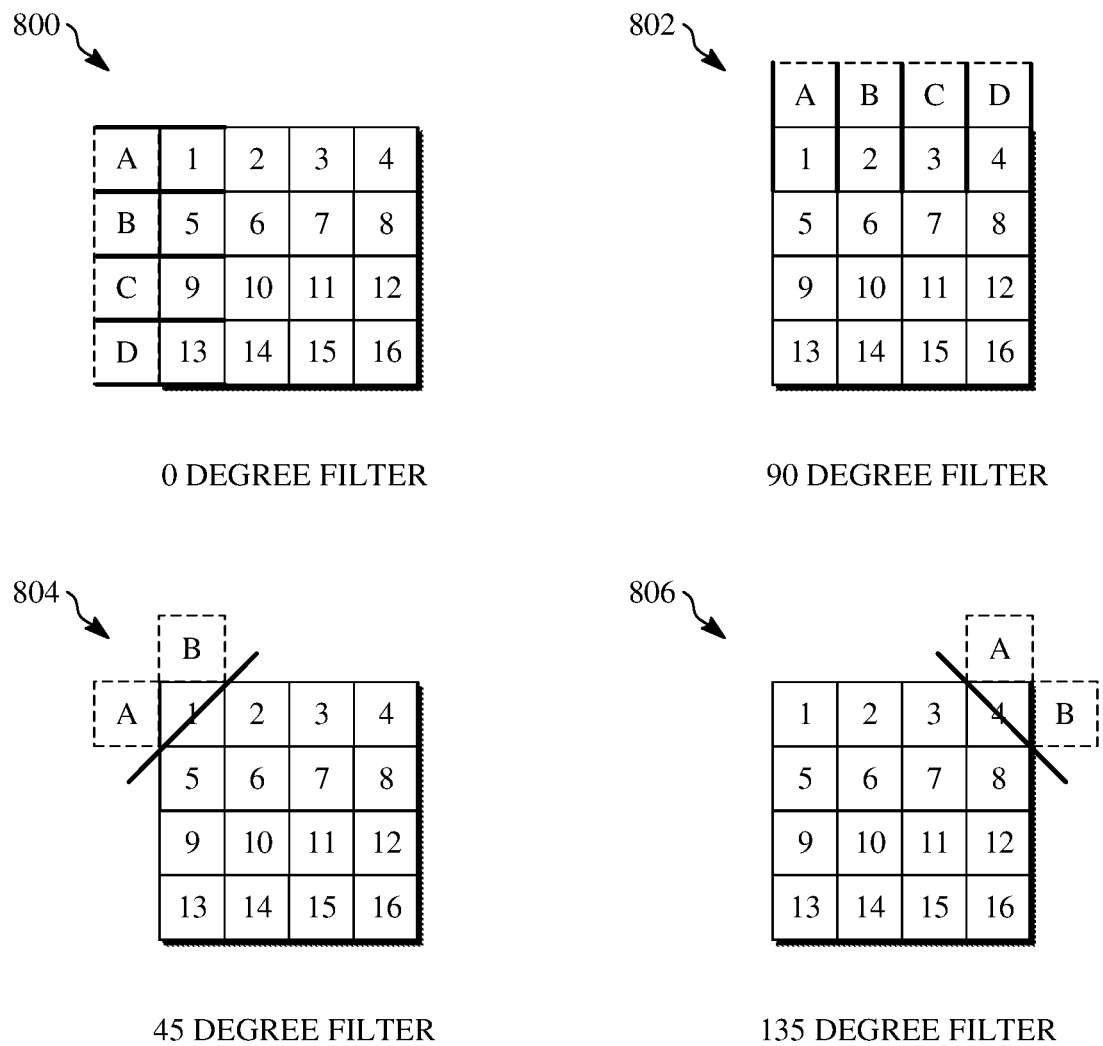
FIG. 8 is a diagram of examples of video blocks filtered using different directional filters.

FIG. 8 is a diagram of examples of video blocks 800, 802, 804, 806 filtered using different directional filters. The video blocks 800, 802, 804, and 806 may, for example, reflect the same video block (or portion thereof) during or after the application of a directional filter thereto. The video block 800 shows lines of pixel along a vertical direction, such as based on the application of a directional filter having a direction of 0 degrees. For example, a first gradient is determined as the difference between the pixel 1 and the pixel A, a second gradient is determined as the difference between the pixel 5 and the pixel B, and so on. The video block 802 shows a lines of pixel along a horizontal direction, such as based on the application of a directional filter having a direction of 90 degrees. For example, a first gradient is determined as the difference between the pixel 1 and the pixel A, a second gradient is determined as the difference between the pixel 2 and the pixel B, and so on.

The video block 804 shows lines of pixel along a diagonal direction, such as based on the application of a directional filter having a direction of 45 degrees. For example, a first gradient is determined as the difference between the pixel 5 and the pixel A, a second gradient is determined as the difference between the pixel 2 and the pixel B, and so on. The video block 806 shows a lines of pixel along another diagonal direction, such as based on the application of a directional filter having a direction of 135 degrees. For example, a first gradient is determined as the difference between the pixel 3 and the pixel A, a second gradient is determined as the difference between the pixel 8 and the pixel B, and so on.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for filtering a video block, the method comprising:
    applying each of a plurality of directional filters to lines of pixels associated with the video block to determine filtered noise values by, for each of the lines of pixels, adding sums of absolute values of pixel gradients, wherein a pixel gradient represents a difference between a first pixel located at a first position within the video block along a line of pixels and a corresponding second pixel located at a second position outside of the video block along the line of pixels, wherein each directional filter of the plurality of directional filters uses a different direction for filtering the lines of pixels;
    selecting, from the plurality of directional filters, a directional filter used to determine a lowest one of the filtered noise values for the video block; and
    filtering the video block using the selected directional filter.

2. The method of claim 1, wherein selecting the directional filter used to determine the lowest one of the filtered noise values for the video block comprises:
    determining that two or more directional filters of the plurality of directional filters are used to determine a same lowest filtered noise value; and
    selecting one of the two or more of the directional filters having a direction corresponding to an edge of the video block.

3. The method of claim 1, wherein filtering the video block using the selected directional filter comprises:
    applying the selected directional filter against each pixel value of each edge of the video block.

4. The method of claim 1, wherein filtering the video block using the selected directional filter comprises:
    storing one or more pixel values of the video block to a buffer; and
    filtering the stored one or more pixel values within the buffer using the selected directional filter.

5. The method of claim 1, wherein a direction of the selected directional filter is one of 0 degrees, 45 degrees, 90 degrees, or 135 degrees.

6. The method of claim 1, wherein a length of the line of pixels against which the selected directional filter is applied is one of one-half of a Y-axis length of the video block or one-quarter of the Y-axis length of the video block.

7. An apparatus for filtering a video block, the apparatus comprising:
    a processor configured to execute instructions stored in a non-transitory memory to:
    apply each of a plurality of directional filters to lines of pixels associated with the video block to determine filtered noise values by, for each of the lines of pixels, adding sums of absolute values of pixel gradients, wherein a pixel gradient represents a difference between a first pixel located at a first position within the video block along a line of pixels and a corresponding second pixel located at a second position outside of the video block, wherein each directional filter of the plurality of directional filters uses a different direction for filtering the lines of pixels;
    select, from the plurality of directional filters, a directional filter used to determine a lowest one of the filtered noise values for the video block; and
    filter the video block using the selected directional filter.

8. The apparatus of claim 7, wherein the instructions to select the directional filter used to determine the lowest one of the filtered noise values for the video block include instructions to:
    determine that two or more directional filters of the plurality of directional filters are used to determine a same lowest filtered noise value; and
    select one of the two or more of the directional filters having a direction that corresponds to an edge of the video block.

9. The apparatus of claim 7, wherein the instructions to filter the video block using the selected directional filter include instructions to:
    apply the selected directional filter against each pixel value of each edge of the video block.

10. The apparatus of claim 7, wherein the instructions to filter the video block using the selected directional filter include instructions to:
    store one or more pixel values of the video block to a buffer; and
    filter the stored one or more pixel values within the buffer using the selected directional filter.

11. The apparatus of claim 7, wherein a direction of the selected directional filter is one of 0 degrees, 45 degrees, 90 degrees, or 135 degrees.

12. The apparatus of claim 7, wherein a length of the line of pixels against which the selected directional filter is applied is one of one-half of a Y-axis length of the video block or one-quarter of the Y-axis length of the video block.

13. A non-transitory computer-readable storage medium comprising processor-executable routines that, when executed by a processor, facilitate a performance of operations for filtering a video block, the operations comprising:
applying each of a plurality of directional filters to lines of pixels associated with the video block to determine filtered noise values by, for each of the lines of pixels, adding sums of absolute values of pixel gradients, wherein a pixel gradient represents a difference between a first pixel located at a first position within the video block along a line of pixels and a corresponding second pixel located at a second position outside of the video block, wherein each directional filter of the plurality of directional filters uses a different direction to filter one or more of the lines of pixels;
selecting, from the plurality of directional filters, a directional filter used to determine a lowest one of the filtered noise values for the video block; and
filtering the video block using the selected directional filter.

14. The non-transitory computer-readable storage medium of claim 13, wherein the operations for selecting the directional filter used to determine the lowest one of the filtered noise values for the video block comprise:
determining that two or more directional filters of the plurality of directional filters are used to determine a same lowest filtered noise value; and
selecting one of the two or more of the directional filters having a direction that corresponds to an edge of the video block.

15. The non-transitory computer-readable storage medium of claim 13, wherein the operations for filtering the video block using the selected directional filter comprise:
applying the selected directional filter against each pixel value of each edge of the video block.

16. The non-transitory computer-readable storage medium of claim 13, wherein the operations for filtering the video block using the selected directional filter comprise:
storing one or more pixel values of the video block to a buffer; and
filtering the stored one or more pixel values within the buffer using the selected directional filter.

17. The non-transitory computer-readable storage medium of claim 13, wherein a direction of the selected directional filter is one of 0 degrees, 45 degrees, 90 degrees, or 135 degrees.

* * * * *